United States Patent Office 3,361,529
Patented Jan. 2, 1968

3,361,529
PRODUCTION OF ALKALI METAL HYDROXIDES
Richard M. Murphy, 359 Mansfield Ave., Darien, Conn. 06820, and Henry C. Messman, 31 Elsworth Road, Larchmont, N.Y. 10538
No Drawing. Filed Nov. 16, 1964, Ser. No. 411,619
16 Claims. (Cl. 23—184)

ABSTRACT OF THE DISCLOSURE

A process for the preparation of alkali metal hydroxides wherein a mixture containing an alkali metal carbonate and carbon in finely divided form is treated with steam.

---

The present invention relates to the chemical reduction of alkali metal carbonates and more particularly to the chemical reduction of alkali metal carbonates to the corresponding alkali metal hydroxides.

A number of methods for producing alkali metal hydroxides have been previously proposed, only two of which are commercially important today. One commercial process, commonly known as the lime-caustic process, depends upon a double decomposition reaction between the alkali metal carbonate and calcium hydroxide. This process is subject to several disadvantages, among which are the relatively high evaporation costs resulting from operation at the higher dilutions found to yield optimum conversion of the alkali metal carbonate, the tendency towards loss of alkali metal hydroxide in the precipitated calcium carbonate slime, and the contamination of the resulting alkali metal hydroxide with calcium carbonate and other impurities. The other commercial process is the electrolytic caustic-chlorine process requiring relatively high capital investment and other costs in the use of electrolytic cells and the like.

It is an object of this invention to provide a method for producing alkali metal hydroxides from alkali metal carbonates which will not be subject to one or more of the above disadvantages. Another object of the invention is the provision of a method for the chemical reduction of alkali metal carbonates to alkali metal hydroxides which is economical, efficient, and/or readily controllable, and/or which enables the production of higher yields of higher purity alkali metal hydroxides. Other objects and advantages will appear as the description proceeds.

The attainment of the above objects is made possible by the present invention which broadly comprises treating a mixture containing an alkali metal carbonate and carbon in finely divided form with steam at a temperature at which the hydroxide of said alkali metal is a liquid until said carbonate is reduced to said hydroxide, and then separating said hydroxide from the mixture by treatment with water.

The process of the present invention is effective for economically reducing alkali metal carbonates such as sodium, or potassium, carbonates or acid carbonates in anhydrous or hydrated form and of natural or synthetic origin, to their corresponding alkali metal hydroxides. The process is particularly effective as applied to trona, a crude sodium sesquicarbonate which occurs naturally in various areas throughout the world. The following description will be concerned with application of the present process for the chemical reduction of sodium carbonates as the preferred alkali metal carbonate, including trona and other forms thereof.

The carbon employed in the process is preferably a solid carbonaceous material in the form of ⅛ inch and smaller particles, or of a size that may be described as 6 mesh x 0, U.S. Standard Sieve, and may be derived from any source, animal, vegetable or mineral. Examples of suitable solid carbonaceous materials (hereinafter called carbon) are coal char, petroleum coke and charcoal. Depending on the initial porosity of the carbon selected and on its other surface characteristics, some activation may be desirable for optimum reduction of a carbonate of an alkali metal to its hydroxide in accordance with the present invention.

If desired, a mixture of the alkali metal carbonate and carbon may be prepared by intimately mixing the finely divided alkali metal carbonate and carbon and/or by grinding together a mixture of the alkali metal carbonate and carbon down to the desired small particle size. The amount of carbon required for reducing the alkali metal carbonate will of course vary in any particular instance depending upon the particular alkali metal carbonate and its purity, the type of carbon, its reactivity and its surface area, the conditions and duration of treatment, and the like, and will be readily determinable by the skilled worker following the teachings of this invention. Generally, about one or less to 20 or more parts by weight of the carbon is employed for each part by weight of the alkali metal carbonate. Higher proportions of carbon would of course be operative but increasingly uneconomical.

According to a preferred mode of carrying out the present process, the alkali metal carbonate is first dissolved in water, solution being aided if desired by first finely grinding the carbonate and employing water boiling at atmospheric or super atmospheric pressures. Saturated solutions are preferred but not necessary, the use of more dilute solutions requiring progressively more heat to evaporate the additional water present, and also requiring an otherwise unnecessary increment of carbon to absorb the solution. This aqueous solution of alkali metal carbonate, preferably saturated or at least 75% of saturation concentration, is then mixed with at least sufficient finely divided carbon to absorb the solution. The optimum amount of carbon necessary for this purpose is again variable, depending upon the type and condition of the carbon, the temperature, the process conditions and the like and can be readily determined. In a typical process, excess carbon will be employed to provide a convenient carrier for the alkali metal compounds. Such excess carbon will be subsequently recovered and recycled.

According to the process of the present invention, the mixture of alkali metal carbonate and carbon, whether a dry mixture or a mixture of the carbonate solution with the carbon, is then heated to a temperature at which the corresponding alkali metal hydroxide is a liquid, i.e. between its melting point and its decomposition, or boiling temperature, and treated at that temperature, optionally under agitation, with steam until the alkali metal carbonate in the mixture is substantially reduced to the corresponding alkali metal hydroxide. The temperature of the mixture may be raised in any desired manner by application of direct or indirect heating of the mixture or the reaction vessel containing the same. For example, a vessel may be employed provided with a jacket for circulating any desired heating medium such as steam, oil or the like, or otherwise provided with external or internal electric resistance, induction, or infra red heating means.

Saturated or super saturated steam may be employed and may be passed through the mixture continuously or intermittently as desired, it being highly desirable however to exclude air, oxygen or similar oxidizing gases during treatment to minimize unnecessary consumption of carbon by oxidation and interference with optimum reduction of the alkali metal carbonate. The optimum temperature and residence time of treatment will be interdependent and will also vary with the carbon employed and the conditions of treatment. The residence time will generally vary inversely with the temperature. For example, when treating a mixture of sodium carbonate and a substantially devolatilized and moderately activated delayed coker petroleum coke, it is preferred to hold the mixture at a temperature of at least about 500° C. for 30 minutes while treating the mixture with steam. A longer residence time for the treatment would be employed with lower temperatures above the melting point of sodium hydroxide (318.4° C.).

According to a preferred embodiment of the invention, the treatment is carried out by the fluidized bed technique by passing the steam in known manner upward through a fluid bed of the finely divided particulate mixture of alkali metal carbonate and carbon whereby contact between the alkali metal carbonate, carbon and steam is facilitated and expedited.

Following completion of the treatment and conversion of a substantial portion of the metal carbonate to the corresponding alkali metal hydroxide, the alkali metal hydroxide is readily separated from its mixture with the carbon as by dissolving in water. Illustratively, the mixture is permitted to cool to below the solidification point of the alkali metal hydroxide, which may then be extracted from the mixture by leaching with water. The resulting alkali metal hydroxide solution may be concentrated, if desired by evaporating or boiling off the water, optimally to a maximum temperature above the melting point of the alkail metal hydroxide if an anhydrous product is desired.

Further improvements and advantages are attributable to the present invention. Thus, it has been found that the activity of the excess carbon employed in the process is substantially increased during the process, whereby it is advantageously recycled together with fresh carbon to replace the carbon consumed during the process for use in reducing fresh increments of alkali metal carbonate according to the process of the present invention. Recirculation of the thus activated carbon permits the efficient use of relatively inactive make-up carbon, which is then activated in situ.

Further, other metallic compounds present as impurities in the alkali metal carbonate or in the carbon tend to be simultaneously reduced and in some instances (iron and cobalt compounds, for example) may be separated from the residual carbon by magnetic means as desired.

The following examples are only illustrative of the present invention and are not to be regarded as limitative. All parts and proportions referred to herein and in the appended claims are by weight unless otherwise indicated.

*Example 1*

Two hundred grams of commercial sodium sesquicarbonate are dissolved in 500 cc. of boiling water and the resulting solution is thoroughly mixed with 1000 grams of solid carbonaceous material having a particle size of no more than ⅛″, hereinafter called carbon. This carbon had previously been prepared by devolatilizing a crushed green delayed coker petroleum coke to less than 5% volatile and by subsequently activating it in a fluid bed with air at 400° C.–450° C. to a 5% carbon weight loss.

The resulting mixture of carbon and sodium sesquicarbonate is then placed in a fluid bed reactor, where it is maintained for 30 minutes at 550° C., during which period it is fluidized by a current of steam for 2 minute intervals and alternately permitted to rest for interim 3 minute intervals.

The mixture is then coled and leached with water at a temperature permitting maximum solubilization of the sodium hydroxide. Carbon is then allowed to settle out of the resulting solution and 0.6 gram of magnetically susceptible material is magnetically removed from the solution, after which the solution is filtered.

The resulting solution is concentrated by slowly heating it to 325° C. at which point 94 grams of substantially pure molten sodium hydroxide remains. The residual carbon, weighing 860 grams, is recycled for use in reducing a fresh charge of sodium sesquicarbonate as described above.

*Example 2*

244 grams of commercial soda ash (sodium carbonate) are dissolved in 600 cc. water and the resulting solution is thoroughly mixed with 1710 grams of carbon which had previously been prepared by activating fluid coker petroleum coke in a fluid bed with air at about 400° C. to a 5% weight loss.

The mixture is placed in a fluid bed reactor where it is maintained at 600–650° C. for 15 minutes during which period the bed is continuously fluidized with an upward current of steam.

The resulting mixture is then cooled, leached with hot water, and carbon permitted to settle out of the resulting solution from which it is separated by decantation and filtration. The solution is then concentrated by slowly heating it to 325° C. Sodium hydroxide, equivalent to 89% of the sodium introduced as soda ash, is recovered in substantially pure form.

This invention has been disclosed with respect to certain preferred embodiments, and it will be understood that various modifications and variations thereof will become obvious to persons skilled in the art and are to be included within the spirit and purview of this application and invention and the scope of the appended claims.

What is claimed is:

1. A method comprising treating a mixture containing an alkali metal carbonate and carbon in finely divided form with steam at a temperature at which the hydroxide of said alkali metal is a liquid until said carbonate is substantially reduced to said hydroxide, and then cooling the mixture to below the solidification point of said hydroxide and separating said hydroxide from the mixture by treatment with water.

2. A method as defined in claim 1 wherein said alkali metal is sodium.

3. A method as defined in claim 1 wherein said alkali metal carbonate is sodium sesquicarbonate.

4. A method as defined in claim 1 wherein said alkali metal carbonate is soda ash.

5. A method comprising intimately mixing an aqueous solution of an alkali metal carbonate with sufficient finely divided carbon to absorb said solution, treating the resulting mixture with steam at a temperature at which the hydroxide of said alkali metal is a liquid until said carbonate is substantially reduced to said hydroxide, and then cooling the mixture to below the solidification point of said hydroxide and separating said hydroxide from the mixture by treatment with water.

6. A method as defined in claim 5 wherein said alkali metal is sodium.

7. A method as defined in claim 5 wherein said alkali metal carbonate is sodium sesquicarbonate.

8. A method as defined in claim 5 wherein said alkali metal carbonate is soda ash.

9. A method comprising treating a mixture in the form of a fluidized bed containing an alkali metal carbonate and carbon in finely divided form with steam at a temperature at which the hydroxide of said alkali metal is a liquid until said carbonate is substantially reduced to said hydroxide and then cooling the mixture to below the solidification point of said hydroxide and separating said hydroxide from the mixture by treatment with water.

10. A method as defined in claim 9 wherein said alkali metal is sodium.

11. A method as defined in claim 9 wherein said alkali metal carbonate is sodium sesquicarbonate.

12. A method as defined in claim 9 wherein said alkali metal carbonate is soda ash.

13. A method comprising intimately mixing an aqueous solution of an alkali metal carbonate with sufficient finely divided carbon to absorb said solution, treating the resulting mixture in the form of a fluidized bed with steam at a temperature at which the hydroxide of said alkali metal is a liquid until said carbonate is substantially reduced to said hydroxide, and then cooling the mixture to below the solidification point of said hydroxide and separating said hydroxide from the mixture by treatment with water.

14. A method as defined in claim 13 wherein said alkali metal is sodium.

15. A method as defined in claim 13 wherein said alkali metal carbonate is sodium sesquicarbonate.

16. A method as defined in claim 13 wherein said alkali metal carbonate is soda ash.

References Cited

UNITED STATES PATENTS 152,845  7/1874  Juron et al. _____ 23—184

FOREIGN PATENTS 3,295  11/1869  Great Britain.

EDWARD J. MEROS, *Primary Examiner.*